United States Patent Office 2,846,725
Patented Aug. 12, 1958

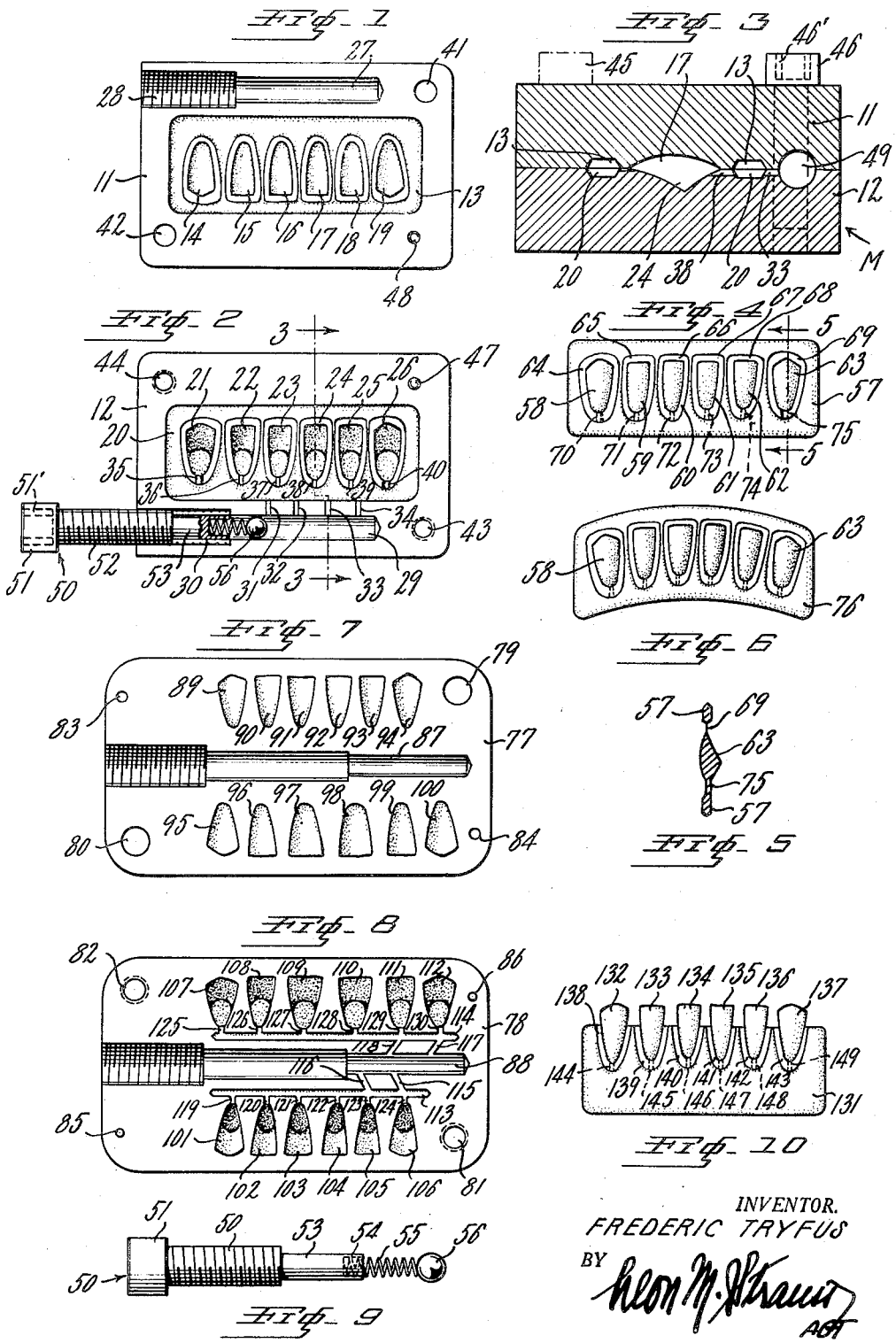

2,846,725
APPARATUS FOR MAKING COMBINATION ARTIFICIAL TEETH AND DISPLAY CARRIER

Frederic Tryfus, Forest Hills, N. Y.

Application January 18, 1955, Serial No. 482,542

2 Claims. (Cl. 18—34.1)

This invention relates to the manufacture of artificial teeth and display carrier means therefor.

In the production of artificial teeth made from porcelain, plastic compositions and like resinous or synthetic materials observation was made that teeth obtained after application of heat and pressure to the aforesaid materials do not always comply with practical requirements as to hardness, lustre, compactness and similar important characteristics.

It has also been found that teeth or tooth pieces resulting from such pressing operations are devoid of completed condensation, lack sufficient density and are subject to shrinkage, warpage and susceptible to undesirable moisture absorption, so that the teeth became either defective or their structure changed after a short storage time and became unusable.

It is further known to employ for the display of the manufactured artificial teeth special carriers onto which the teeth are mounted and exposed to view in order to facilitate comparison and selection of the teeth in regard to those to be replaced in the patient's mouth.

The present invention overcomes the aforesaid and other disadvantages inherent in these known teeth structures and provides means contributing to a considerably improved tooth made from synthetic or like materials and simultaneously affording a support or carrier for displaying said tooth.

Still another object of the present invention is to provide means facilitating a considerable reduction in time, operational steps and cost in the manufacture of combination artificial teeth and display structures.

It is still another object of the present invention to provide means conducive to a reduction in shipping costs and in storage space of artificial teeth together with display frames therefor.

These and other objects of the invention will become further apparent from the following detailed description, reference being made to the accompanying drawing, showing a preferred embodiment of the invention.

In the drawing:

Fig. 1 is a plan view of the inner surface of one of the mold sections embodying the present invention;

Fig. 2 is a plan view of a corresponding inner surface of a second mold section with a pressure device;

Fig. 3 is a cross sectional view of an assembled mold taken along line 3—3 of Fig. 2;

Fig. 4 is a plan view of a set of artificial teeth incorporated in a display carrier or frame produced together with said teeth in accordance with the invention;

Fig. 5 is a sectional view of Fig. 4 taken along line 5—5;

Fig. 6 is a plan view of a modified type of display carrier with teeth;

Fig. 7 is a plan view of the inner surface of a modified mold section;

Fig. 8 is a plan view of a corresponding inner surface of a modified mold section adapted to be used with the section of Fig. 7;

Fig. 9 is an enlarged side view of the pressure exerting screw; and

Fig. 10 is a plan view of a modified display carrier and teeth supported therein and made according to the invention.

Referring now more particularly to Figs. 1, 2 and 3, the mold, generally designated by M, consists of two substantially rectangular mated mold sections 11 and 12. Mold section 11 is provided with a central depression or frame recess 13 in the base of which a plurality of tooth-shaped cavities 14, 15, 16, 17, 18 and 19 are formed. Mold section 12 is provided with a central depression or frame recess 20 corresponding generally to recess 13 and provided with a plurality of tooth-shaped cavities 21, 22, 23, 24, 25 and 26 corresponding, respectively, to cavities 14 to 19 in section 11.

Adjacent one side of mold section 11 there is provided a trough 27 provided with an enlarged threaded portion 28 adjacent its outer end. A corresponding trough 29 having an enlarged threaded portion 30 is formed in mold section 12.

Between trough 29 and recess 20 there are provided a plurality of channels 31, 32, 33 and 34, establishing communication between the trough and the recess for a purpose to be more fully described below. A plurality of channels 35, 36, 37, 38, 39 and 40 lead from recess 20 to the various tooth-shaped cavities 21 to 26 respectively. As may be seen from Fig. 3, upon assembly of sections 11 and 12 recesses 13 and 20 are combined to form a groove communicating with and surrounding the tooth-shaped cavities and lying substantially in the plane of the latter.

Mold section 11 is additionally provided with a pair of guide holes 41 and 42 located at opposite diagonal corners of the section. Mold section 12 is provided with a pair of threaded holes 43 and 44 also located at opposite diagonal corners of the mold sections. When sections 11 and 12 are placed togethed with their inner surfaces in face to face relation, a pair of threaded bolts 45 and 46 may be inserted into holes 42—44 and 41—43, respectively, the bolts being provided in their heads with suitable means, such as a hexagonal groove 46', to accommodate a tool or wrench which may be manipulated to cause said screws to clamp the two mold sections together. A bead or projection 47 formed on mold section 12 cooperates with a recess or depression 48 to aid in centering and accurately locating the mold sections relative to one another.

Upon assembly of mold sections 11 and 12, troughs 27—28 and 29—30 are united to form a passageway 49 having at its outer or open end an internally threaded portion of enlarged cross section. A pressure exerting screw or similar device, generally designated as 50, is provided with a head 51, a threaded shank portion 52, and a smooth shank portion 53 of reduced diameter, and is adapted to be threaded into portion 28—30 of passageway 49.

Formed in head 51 is a hexagonal groove 51' to accommodate a manipulating tool or wrench while shank portion 53 is provided at its front end with a recess 54 adapted to accommodate and seat a spring 55. A ball or similar piston member 56, having a diameter substantially equal to that of passageway 49, is adapted to slide through the passageway under action of screw 50 through the intermediary of spring 55. Ball 56 may, if desired, be attached to the forward end of spring 55.

In operation, a mass of a suitable acrylic plastic, such as methyl methacrylate or similar polymerizable material, is placed on the inner surface of each of the mold sections, after which they are brought together with their inner surfaces in face to face relation and affixed to one another by means of screws 45 and 46. Subsequently, additional plastic material, which is either already in or is fed into passage 49, is forced from passageway 49 through the various channels 31 to 34 into recess 13—20 and therefrom through channels 35 to 40 into the various tooth recesses 14—21 to 19—26 by piston 56 as the latter is advanced through the passageway upon rotation of screw 50.

Upon application of sufficient heat and pressure to the mold and to the material retained within the mold cavities, said material will become polymerized and hard, after which it may be removed from the mold in the shape shown in Fig. 4.

In general, the molded product consists of a display carrier or frame 57 having a plurality of artificial teeth 58, 59, 60, 61, 62 and 63 held by said frame by means of thin flashes of plastic material 64 to 69 and by means of a plurality of rod-like members 70 to 75, the latter consisting of solidified plastic which was originally contained in channels 35 to 40, respectively. The thin plastic flashes 64 to 69 are obtained from corresponding flat and shallow depressions surrounding the cavities for forming the teeth and are in communication with channels 35 to 40 as seen in Fig. 2.

It is not essential, however, that mold sections 11 and 12 and recesses 13 and 20 be rectangular or plane. If desired, one of the sections may be curved convexly and the other concavely to provide an arched display frame. Alternatively, recesses 13 and 21 may be arcuately shaped to provide an arcuate display frame, such as 76 in Fig. 6.

Referring now to the modified embodiment illustrated in Figs. 7 and 8, the mold consists of a pair of mold sections 77 and 78, provided with diagonally disposed holes 79—80 and 81—82, respectively, corresponding in function to holes 41 to 44 of mold sections 11 and 12. Section 77 is further provided with supplementary guide holes or recesses 83 and 84, and section 78 is provided with guide pins or rods 85 and 86 adapted to fit into holes 83 and 84, respectively. A pair of troughs 87 and 88, which upon assembly of the mold sections are combined to form a passageway similar to passageway 49, are located centrally of sections 77 and 78, respectively, at the inner surfaces thereof. Troughs 83 and 84 are provided with portions of different diameters, the outer and larger portions being internally threaded to receive a pressure-exerting screw such as 50 therein.

Mold section 77 is provided with a first set of tooth-shaped recesses or cavities 89 to 94 on one side of trough 83 and with a second set of such cavities 95 to 100 on the other side of trough 83. Similarly, section 78 is provided on both sides of trough 84 with two sets of tooth-shaped cavities 101 to 106 and 107 to 112, corresponding, respectively, to the two sets of cavities in section 77. A pair of longitudinal grooves 113 and 114 extend parallel to trough 84 in section 78 and communicate with the trough by means of respective pairs of transverse channels 115—116 and 117—118. Grooves 113 and 114 are also in communication with the various tooth-shaped cavities 101 to 112 by means of a plurality of individual channels 119 to 130.

The molding operation to be performed with the modified mold of Figs. 7 and 8 is substantially similar to that described with reference to Figs. 1 to 3. The acrylic material retained within the mold is compressed and forced from the trough through channels 115 to 118 into grooves 113 and 114 and channels 119 to 130 and therethrough into the tooth cavities, to be polymerized and hardened therein. In the mold according to Figs. 7 and 8, however, there are produced a pair of display frames or carriers each of which consists only of an elongated rod and a plurality of transverse, short rod or finger members (not shown), the individual teeth being carried by the latter.

A further modification of the mold of Figs. 7 and 8 is obtained by substituting for grooves 113 and 114 a pair of enlarged recesses or depressions (not shown), each of which extends laterally away from trough 88 and has a width equal to about half the length of a tooth to be formed. The finished forms in this case are shaped as shown in Fig. 10, each form comprising a display carrier 131 in which teeth 132 to 137 are supported by means of thin plastic flashes 138 to 143 and rod-like members 144 to 149, respectively. It is to be noted that only approximately one half of each tooth is retained within the confines of the carrier. This, as will be readily realized, provides not only for as facile an inspection of the teeth as regards coloring, shading, and shape, as does the embodiment of Figs. 1 to 3, but additionally permits inspection of the cutting edge of each tooth to a degree not possible in the molds shown in Figs. 4 to 6. The same result may, of course, be obtained by simply blocking off the portions of recesses 13 and 20 which are located adjacent the incisal ends of the tooth-shaped cavities.

As may be determined from the foregoing description, teeth manufactured in accordance with the invention are more sturdy, compact, and wear resistant, as well as less susceptible to water absorption, shrinkage, and warpage than teeth manufactured in accordance with prior methods. To a great extent this is due to the provision of the troughs, grooves, and channels in the molds through which the tooth forming material is forced. Thus, the reduced cross-sections of the grooves and channels reduce the rate of flow of said material into the tooth-shaped cavities and result in a more complete and uniform compaction than has heretofore been possible.

Further, due to the reduced cross-sections of the channels as well as the presence of spring 55, a shock absorbing effect is provided which tends to prevent application of sudden or highly magnified compressive stresses or shocks to the tooth-forming material.

Spring 55 also serves a compensating function. Thus, certain materials expand upon being polymerized, and the spring, therefore, permits not only uniform application of compacting forces but permits a gradual expansion of the polymerized material within the mold cavities. This same result may, of course, be accomplished in the absence of a spring by slowly and gradually backing off screw 50 and piston 56.

If desired, means may be incorporated in a well known manner in screw 50 to measure the forces applied to the tooth-forming material. Such means may, for example, comprise an indicator (not shown) in the head of screw 50 actuated by a rod (not shown) passing through the shank portions of the screw and contacting the spring. Other types of indicating means will readily come to mind to those skilled in the art and thus need not be further mentioned or illustrated.

It will also be seen that screw 50 and ball 56 may be replaced by other means functioning as a piston to displace the tooth forming material from the reservoir constituted by the troughs or passageways into the tooth-shaped cavities. Quite understandably, the piston need not be oriented as shown but may be located at any desired portion of the mold where access to the reservoir can be provided. The piston may be curved or angular in cross-section, as the occasion demands.

It is preferred that the material employed in carrying out the present invention be thermoplastic in nature. This will permit a set of teeth in a display frame to be formed with any of the plane-faced molds disclosed, after which the frame may be heated slightly and bent to curved shape, as shown in Fig. 6, for example. The teeth are then located in a curved path in a manner similar to their prospective arrangement in the mouth of a user.

When it is desired to remove one or more of the teeth from the carrier, it is merely necessary to break the appropriate frangible flash and/or rod-like member. As may be seen from Fig. 5, the flashes, such as 69, are very thin, being substantially tissue-like in appearance. The rod-like members, such as 75, are somewhat thicker and resemble a portion of a toothpick in appearance. Nevertheless, they are sufficiently strong to retain the teeth in the frame.

Should a tooth be accidentally or otherwise broken out of the frame, it may be replaced therein very simply.

Thus, it may be reattached to the frame by means of a small blob of wax or by means of some suitable glue or cementing material. An alternative and preferred method of reattachment is to employ in lieu of glue or cement a substantially liquid mix of the same monomer or material which was employed to form the teeth. After a few minutes of curing time, the additional material will be polymerized and the bond between the tooth and the frame reestablished.

The mold according to the present invention may also be employed to form teeth of porcelain or like substances. In such a case, no polymerization can, of course, take place. Rather, subsequent to hardening of the porcelain teeth in the mold, the teeth are removed therefrom and placed into a suitable oven to be baked therein to finished condition.

In accordance with the invention, it is possible to form teeth with gradations of shade or pigmentation from the cervical to the incisal ends of the teeth. In a preferred procedure to attain such gradations, material of a predetermined shade or degree of coloration or opacity is placed into the mold and preformed without being subjected to action of screw 50 and without being permitted to solidify or become polymerized.

Thereafter, the mold sections are separated and a portion of the still relatively soft material, say at the incisal ends of the preformed teeth, is removed or cut off and replaced by soft or fluid material of the same type but having a different shade or degree of coloration or opacity. The mold is then reassembled and pressure and heat applied to the material to polymerize the same. The resultant teeth then have the desired shade or color gradations, and the zones of different shades or colors blend smoothly into one another with no visible lines of demarkation between them.

It will, therefore, be readily appreciated that the invention provides not only improved methods and means for manufacturing artificial teeth, but also provides novel means for mounting such teeth for display purposes. Thus, heretofore known display devices generally comprise a frame member having a portion made of wax or like impressionable material in which the teeth are individually mounted. There is, however, always a danger of one or more of the teeth falling out of the frame and being lost or damaged. The present invention overcomes this deficiency by fixedly retaining all the teeth in the display frame where they may be easily inspected for color, size, shape and other essential characteristics from all angles without hinderance or possibility of displacement from the frame.

It is further to be noted, as demonstrated in Fig. 2, that channels or sprues 35 and 40 leading to teeth cavities 21 and 26 may be somewhat greater in width than the remaining sprues, as teeth 58 and 63 formed in these cavities are of larger cross-section and require more molding material.

It is furthermore of importance that the pressure exerted by device 50 through ball or piston 56 is not communicated directly to the cavities for molding the teeth, but rather indirectly and through the intermediary of the frame molding material, the latter, in turn, during the ensuing polymerization having the tendency of expanding acts against the spring-supported ball 56 which may recede in a valve-like manner within passageway 49.

It is further to be observed that the molding material, when displaced by means of pressure device 50, flows within teeth cavities 21 to 26 in a direction longitudinally of and not transversely to said cavities, so that a uniform and equal pressure may be exerted lengthwise of the molding material. Thus, in those parts of reduced dimensions of the teeth, in particular where resistance to abrasion due to mastication is required, the density of the molded tooth-forming material may be most favorably regulated during and immediately after polymerization.

The frame material may, therefore, function as a buffer. The pressure is exerted through the intermediary of device 50 for obtaining substantially equal consistency and density in regard to a tooth having different cross sections throughout its length and, consequently, is regulated in a manner so that also the weakest part of the tooth, in particular at the incisal part, shows maximum density.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A device for forming artificial teeth of relatively high density from a formable material, comprising at least two mold portions, each of said mold portions being provided with complementary, juxtapositioned elongated cavities for molding therein said teeth and for receiving and compressing said formable material when said mold portions are closed, trough means located in at least one of said portions and extending from one end of the latter in a direction transversely to the length of said cavities and spaced therefrom, said mold portions being provided with respective frame forming recess means at least partly encompassing said cavities, and elongated channel means establishing communication between said cavities and said trough means via said frame forming recess means for delivering additional formable material to said cavities, said trough means including pressure exerting means movable therein and adapted to supply said additional material from said trough means toward said cavities in lengthwise direction of the latter, whereby further pressure may be exerted on said formable material when contained in said cavities of said closed mold portions.

2. Means for producing artificial teeth from compressible and hardenable plastic material comprising at least two complementary molding means each provided with corresponding elongated cavities for holding said material, said molding means being constructed to receive a pressure in substantially perpendicular direction to said elongated cavities to thereby compress said material in said cavities and thus defining the thickness of the respective teeth to be formed, groove means disposed to extend a predetermined distance at least partly about said cavities and in communication with the same to form when filled with said material a display frame for said teeth, said molding means being further provided with depressions completely surrounding said cavities and defining the peripheral contours of said cavities, said depressions being substantially flat and shallow relative to said groove means and said cavities to form respective flashes between said frame and said teeth, and trough means extending in transverse direction to and spaced from said cavities and including pressure exerting means, said trough means communicating with said groove means, whereby further compressible material when received in said trough means may be transferred through said pressure means into said groove means and thence to said cavities in the direction of the length of said cavities.

References Cited in the file of this patent

UNITED STATES PATENTS

| | | |
|---|---|---|
| 2,345,305 | Thornton | Mar. 28, 1944 |
| 2,454,847 | Slack, Jr. | Nov. 30, 1948 |
| 2,554,845 | Thornton | May 29, 1951 |
| 2,654,949 | Whiteley, Jr. et al. | Oct. 13, 1953 |
| 2,703,435 | Watson | Mar. 8, 1955 |

FOREIGN PATENTS

| | | |
|---|---|---|
| 961,949 | France | May 25, 1950 |
| 566,518 | Great Britain | Jan. 2, 1945 |